(12) United States Patent
Blain et al.

(10) Patent No.: US 8,612,093 B2
(45) Date of Patent: Dec. 17, 2013

(54) AUTOMATIC DYNAMIC CONTROL OF AIRCRAFT CABIN SYSTEMS

(75) Inventors: Christopher M. Blain, Binghamton, NY (US); William Naro, Endwell, NY (US)

(73) Assignee: BAE Systems Controls Inc., Johnson City, NY (US)

( * ) Notice: Subject to any disclaimer, the term of this patent is extended or adjusted under 35 U.S.C. 154(b) by 3 days.

(21) Appl. No.: 13/402,412

(22) Filed: Feb. 22, 2012

(65) Prior Publication Data

US 2013/0218409 A1 Aug. 22, 2013

(51) Int. Cl.
*G06F 7/00* (2006.01)

(52) U.S. Cl.
USPC .......................................................... 701/36

(58) Field of Classification Search
USPC .......................... 701/36, 3, 14; 340/500–501; 474/75–76, 69–71; 244/117 R, 118.5; 725/74, 76; 362/470–471
See application file for complete search history.

(56) References Cited

U.S. PATENT DOCUMENTS

| | | | |
|---|---|---|---|
| 3,706,914 A | 12/1972 | Van Buren | |
| 5,426,732 A | 6/1995 | Boies et al. | |
| 6,346,892 B1 | 2/2002 | DeMers et al. | |
| 6,584,382 B2 | 6/2003 | Karem | |
| 7,305,842 B1 | 12/2007 | Schiff | |
| 7,607,318 B2 | 10/2009 | Lui et al. | |
| 7,641,370 B2 * | 1/2010 | Heine et al. | 362/471 |
| 7,658,669 B2 | 2/2010 | McCoy | |
| 7,788,631 B2 | 8/2010 | Sieron et al. | |
| 7,962,259 B2 * | 6/2011 | Schafer et al. | 701/36 |
| 2004/0249521 A1 * | 12/2004 | Petersen et al. | 701/3 |
| 2005/0067530 A1 * | 3/2005 | Schafer et al. | 244/118.5 |
| 2006/0187081 A1 | 8/2006 | Gloisten et al. | |
| 2006/0211359 A1 * | 9/2006 | Arthurs et al. | 454/74 |
| 2008/0104642 A1 * | 5/2008 | Galipeau et al. | 725/76 |
| 2012/0072079 A1 * | 3/2012 | Schliwa et al. | 701/49 |

FOREIGN PATENT DOCUMENTS

| | | |
|---|---|---|
| DE | 197 10 286 C1 | 6/1998 |
| DE | 10 2010 015 518 A1 | 10/2011 |
| RU | 2009147470 A | 8/2011 |

OTHER PUBLICATIONS

International Search Report and the Written Opinion dated May 16, 2013.

* cited by examiner

*Primary Examiner* — Yonel Beaulieu
(74) *Attorney, Agent, or Firm* — Scully, Scott, Murphy & Presser, P.C.

(57) ABSTRACT

An inventive system and method for vehicle cabin control is presented. The method comprises creating one or more collections of set-points, each set-point comprising a duration and settings for one or more cabin features; establishing an order and duration for the set-points; uploading the set-points to a cabin management system; executing the set-points in the established order; and when a request is received, modifying the duration in accordance with user preferences based on the request. In one aspect, the cabin features comprise one or more of lighting, Cabin Ready, Cabin Temperature, Cell Phone Power and Special Purpose features. In one aspect, one of the collection of set-points is the initial features and another of the collection of set-points is the termination features.

12 Claims, 5 Drawing Sheets

AUTOMATIC DYNAMIC CONTROL OF AIRCRAFT CABIN SYSTEMS

FIELD OF THE INVENTION

The present invention generally relates to aircraft cabin systems and configuring dynamic scenes based on static scenes in such systems.

BACKGROUND OF THE INVENTION

Aircraft cabin management systems can rely on manual commands being entered by flight attendants to update the state of the cabin and attendant work areas to control general lighting, passenger services and attendant services to match desired functional needs. This conventional method is considered to be static manual control, since the state of the cabin does not change until the flight attendant invokes a change by manually entering commands into the cabin management system.

A typical Cabin Interior system of a cabin management system is shown in FIG. 1. This system has Airplane Configuration Information 10, a user interface tool called the Scene Database Generator 12, which interacts with the user to create a scene database 14 which can be loaded into Attendant Control Panels (ACPs) 18 with a Data Loader 16. The ACP provides Scene Data 20 to the Lighting Units 22. The Scene Database Generator 12 can also generate Airplane Configuration Reports 24.

On some aircraft, the Cabin Interior system consists of one or more ACPs, each of which contains a computer, software, and an airplane configuration database. The ACPs interface with programmable lighting units 22 on the airplane to control airplane lighting and the ACPs contain hardware outputs used for other Cabin Interior options such as in-flight entertainment power, Cabin Ready, Cabin Temperature, Cell Phone Power and Special Purpose, e.g., configurable output and/or other functions. A typical ACP 18 consists of a touch panel and display which presents screens and buttons by which the attendant and maintenance personnel can perform control functions. The lighting units are able to store light settings for static lighting configurations or "scenes", each of which defines the desired lighting color and intensity for the unit in a particular scene. The lighting units receive commands from the ACP to change from one scene to another.

These cabin management systems allow flight attendants to change the aircraft lighting and cabin interior options by pressing buttons on the ACP, but require manual intervention by a flight attendant to make each change in the cabin settings. There is a need for an automated, dynamic control approach, which changes the state of the cabin system based upon predefined sequences of static cabin system states, i.e. lighting, passenger services, and attendant services, instead of requiring manual intervention by the flight attendants.

SUMMARY OF THE INVENTION

A novel system and method that provides a solution to enhancing the customer experience by providing automated control of passenger and attendant services and cabin activity synchronized dynamic mood lighting and functionality, while reducing flight attendant workload, is presented.

The novel method for vehicle cabin control comprises creating one or more collection(s) of set-points, each set-point comprising a duration and settings for one or more cabin features; establishing an order and duration for the set-points; uploading the set-points to a cabin management system; executing the set-points in the established order; and when a request is received, modifying the duration in accordance with user preferences based on the request.

In one aspect, the cabin features comprise one or more of general lighting, passenger services and attendant services. In one aspect, one of the collection of set-points is the initial features, and another of the collection of set-points is the termination features.

The novel system for vehicle cabin control comprises a cabin management system having a processor and a module operable to create one or more collection(s) of set-points, each set-point comprising a duration and settings for one or more cabin features; to establish an order and duration for the set-points; to upload the set-points to the cabin management system; to execute the set-points in the established order; and when a request is received, to modify the duration in accordance with user preferences based on the request.

In one aspect of the system, the cabin features comprise one or more of general lighting, passenger services and attendant services, and/or Cabin Ready, Cabin Temperature, Cell Phone Power and Special Purpose features. In one aspect of the system, one of the collection of set-points is the initial features, and another of the collection of set-points is the termination features.

A computer readable storage medium storing a program of instructions executable by a machine to perform one or more methods described herein also may be provided.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

An inventive system and method for vehicle cabin control is presented. This technology enables its users to establish various "scenes" or environmental settings for a vehicle's cabin, including duration or the length of time the settings will apply, and then to execute these scenes automatically. In addition, the settings in each scene can be changed during execution in response to user preferences such as unexpected changes in cabin conditions.

The process begins with a static scene, which is a color and intensity setting specified for each light type in the system. The static scene is the palette or building block for compositing a dynamic scene, in that a static scene becomes a set-point in a dynamic scene. Each set-point has a duration. Accordingly, a dynamic scene is a sequence of static scenes or set-points of varying durations.

Figure 1:
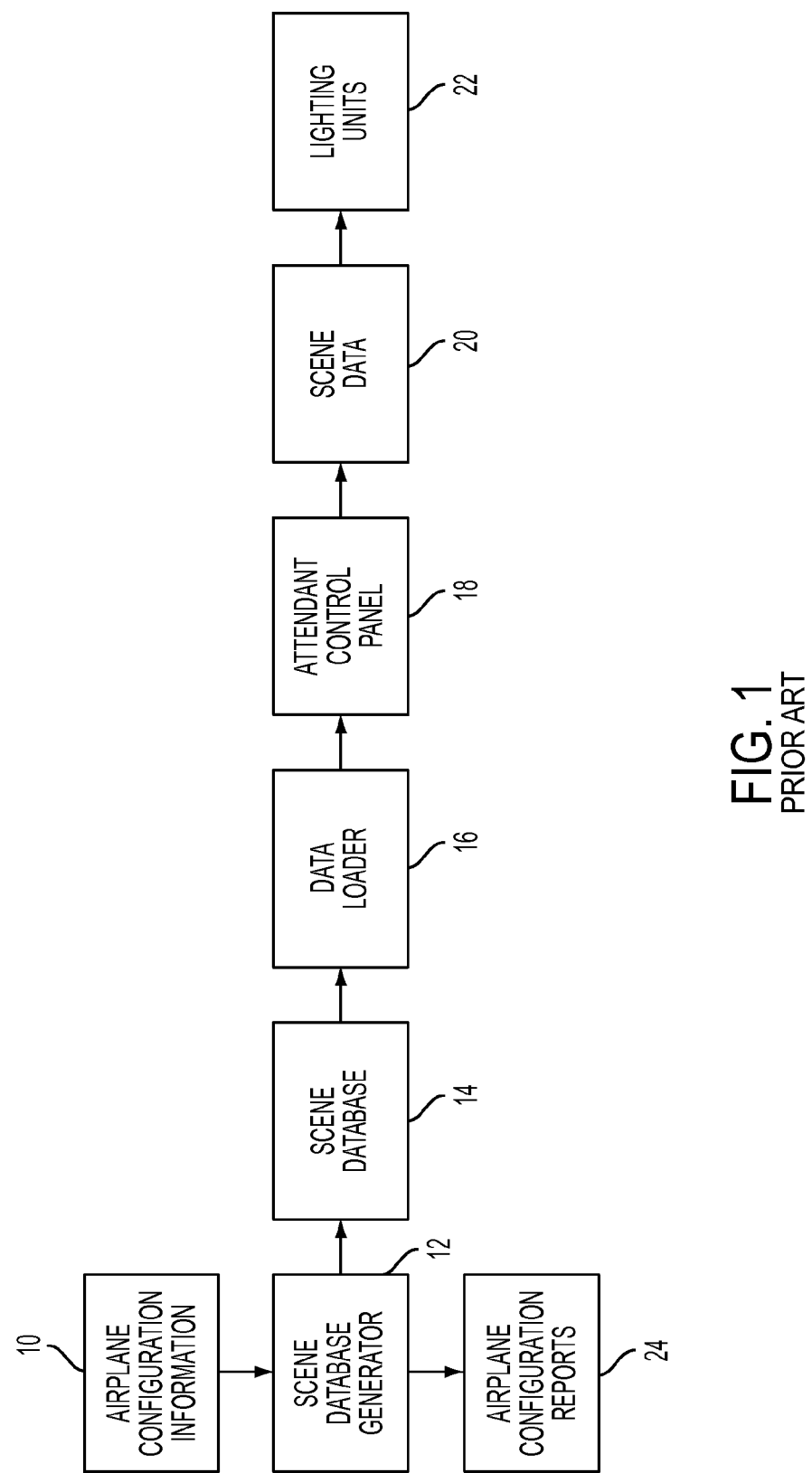
FIG. 1 illustrates a known aircraft cabin management system.
Figure 2:
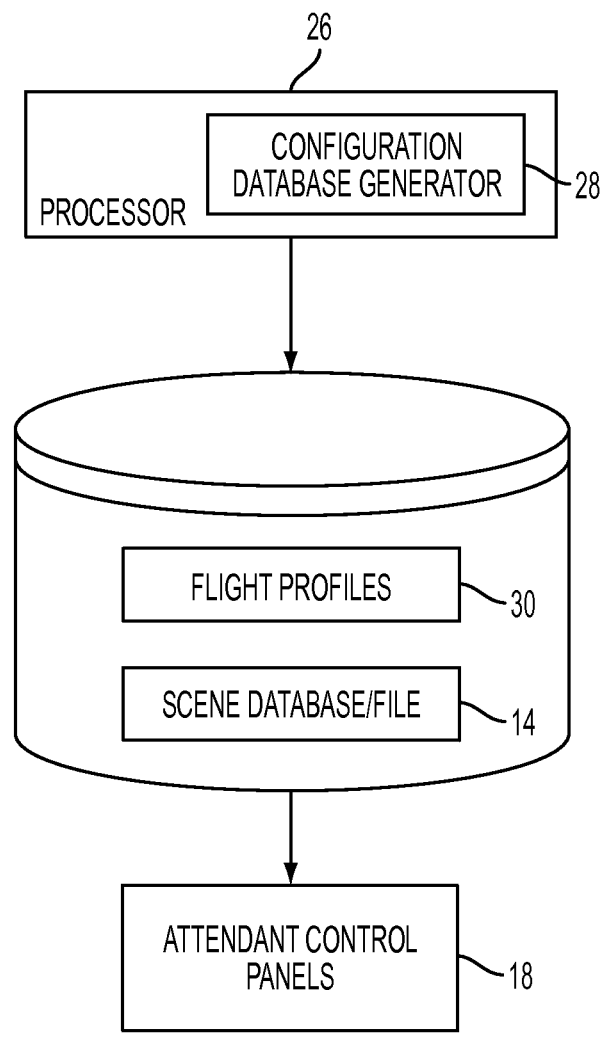
FIG. 2 is a schematic diagram of key components of the inventive cabin management system.

FIG. 2 shows components of the inventive system, including a processor 26, a Configuration Database Generator (CDG) 28, loadable data files including CDG files and/or scene database files 14 and Flight Profiles or set-points 30, and Attendant Control Panels 18. The inventive system may also include other components shown in FIG. 1. In the inventive system, the novel flight profiles 30 are loadable data files comprising dynamic cabin management system control profiles that enhance typical cabin management systems. The content of these flight profiles can be created by specifying sequences of static cabin system states, each with an associated duration, and further specifying the cabin services, i.e. attendant work area(s) and/or passenger in-flight entertainment, lighting, etc., that are to be available or commanded during each state. In this manner, the flight profiles 30 can be tailored for the various routes scheduled for an individual vehicle. These flight profiles can be defined and added to the vehicle, e.g., aircraft, configuration data as well as saved in appropriate loadable format for the ACPs 18, using the Configuration Database Generator 28. A flight profile entry typically consists of a time interval, one or more light settings for each controllable area of the vehicle's cabin, and one or more cabin control settings for that interval.

Figure 3:
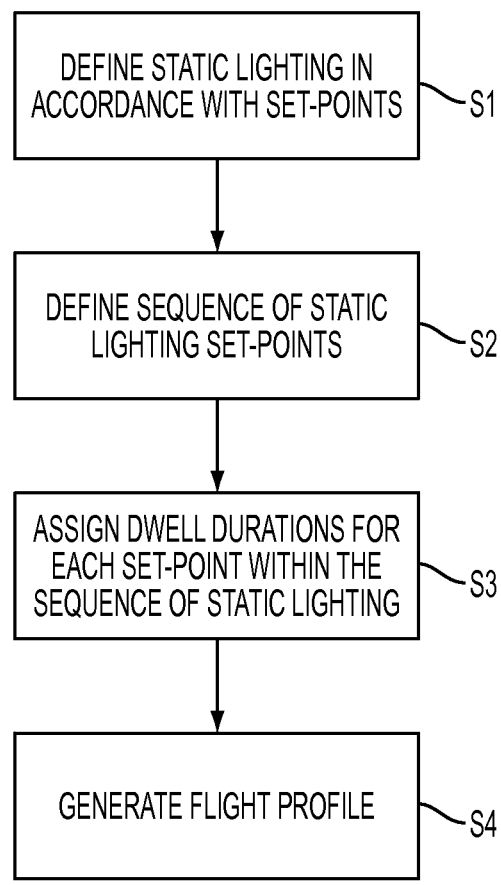
FIG. 3 is a flow diagram for creating the flight profile.

FIG. 3 is a flow diagram for creating the flight profile. In step S1, a user at a computer or PC or other appropriate device executes the CDG 28 and defines static lighting in accordance with a collection of set-points. The user maps, for example, lights, such as different models including ceiling lights, wall lights, etc., by mapping color and intensity to each light model or type. For instance, in a scene that represents "off", each light type is mapped to OFF. That is, the user selects all light types and specifies the intensity at each light type as OFF. This mapping is saved as a scene. Another scene can have some light types specified at a certain intensity, other light types at another intensity, and yet other light types at OFF.

In step S2, using the CDG, a sequence of the scenes is defined. The collection of scenes to be used at the start of the sequence can be called the initial features, and the collection of scenes to be used at the end or termination of the sequence can be called the termination features.

In step S3, dwell durations are assigned for each set-point within the sequence of static lighting. In step S4, a flight profile is generated for the loadable CDG, that is, loadable database entries including flight profiles are created from the sequence of scenes created in S2. These loadable database entries are uploaded to the ACP in the vehicle's on-board computer system.

The cabin management system uploads and executes the set-points or dynamic cabin management profiles by comparing the elapsed time within a dynamic profile segment to the total duration of the profile segment and issuing commands to change the state of the cabin system as defined within the dynamic profile segment. Start time of the next scene is based upon either a manual command or completion of the prior scene.

Figure 4:
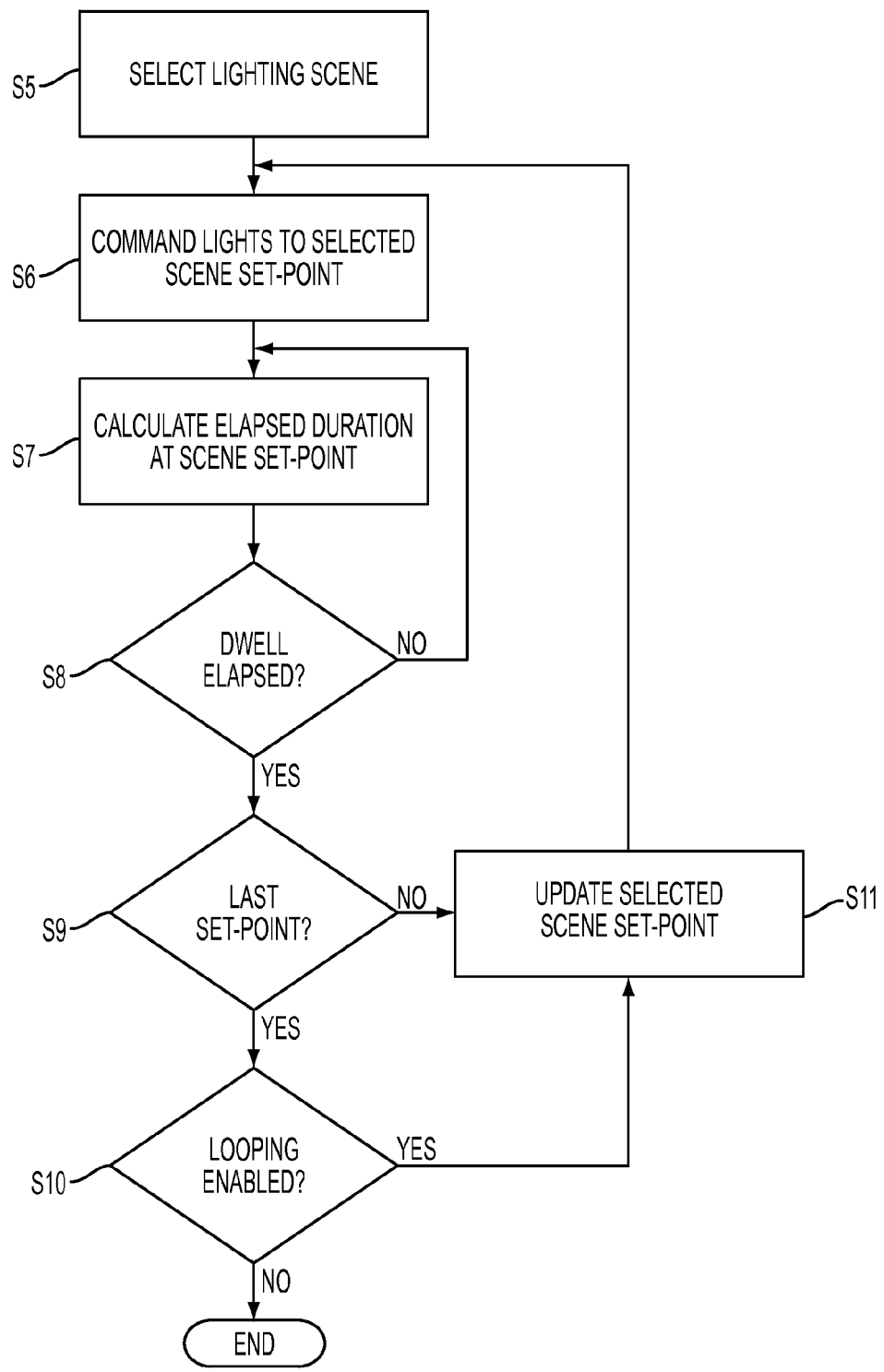
FIG. 4 is a flow diagram for control of cabin lighting.

FIG. 4 is a flow diagram for control of cabin lighting. In step S5, select the lighting scene to be activated. This can be performed by a flight attendant or other cabin personnel including maintenance personnel. In step S6, the ACP commands lights to be set to the specified scene set-point. In step S7, the ACP calculates the Dwell, that is, the elapsed duration at the current scene set-point. If Dwell is not elapsed (S8=NO), continue processing at step S7.

If Dwell is elapsed (S8=YES), then if this is the last set-point (S9=YES), then determine if Looping is enabled. If Looping is enabled (S10=YES), then update the selected scene set-point at step S11. Otherwise (S10=NO), the process terminates. If this is not the last set-point (S9=NO), then update the selected scene set-point at step S11 by continuing processing at S6.

In the inventive technology, the flight attendant has ability to pause, play, rewind or skip ahead within the dynamic profile or set-point to allow the re-synchronization of the cabin management system to the phase of flight or service. Re-synchronization can be performed based upon mitigating circumstances such as late departures, early arrivals, skipped meal service due to turbulence, etc. Specifically, the control panel or ACP allows flight attendants to select and start a flight profile, e.g., set-point, from the loadable database. Cabin lighting and passenger services will automatically be sequenced based on the time into each flight leg. Flight attendants can control or modify playback using VCR-style controls on the panel. Existing ACP control functions can be maintained, allowing the flight attendant to override any of the timer-caused changes. A separate screen can be added to allow selection of the flight profile, show the time remaining in the current flight segment, the time remaining in the entire flight, and to hold the profile playback controls.

Figure 5:
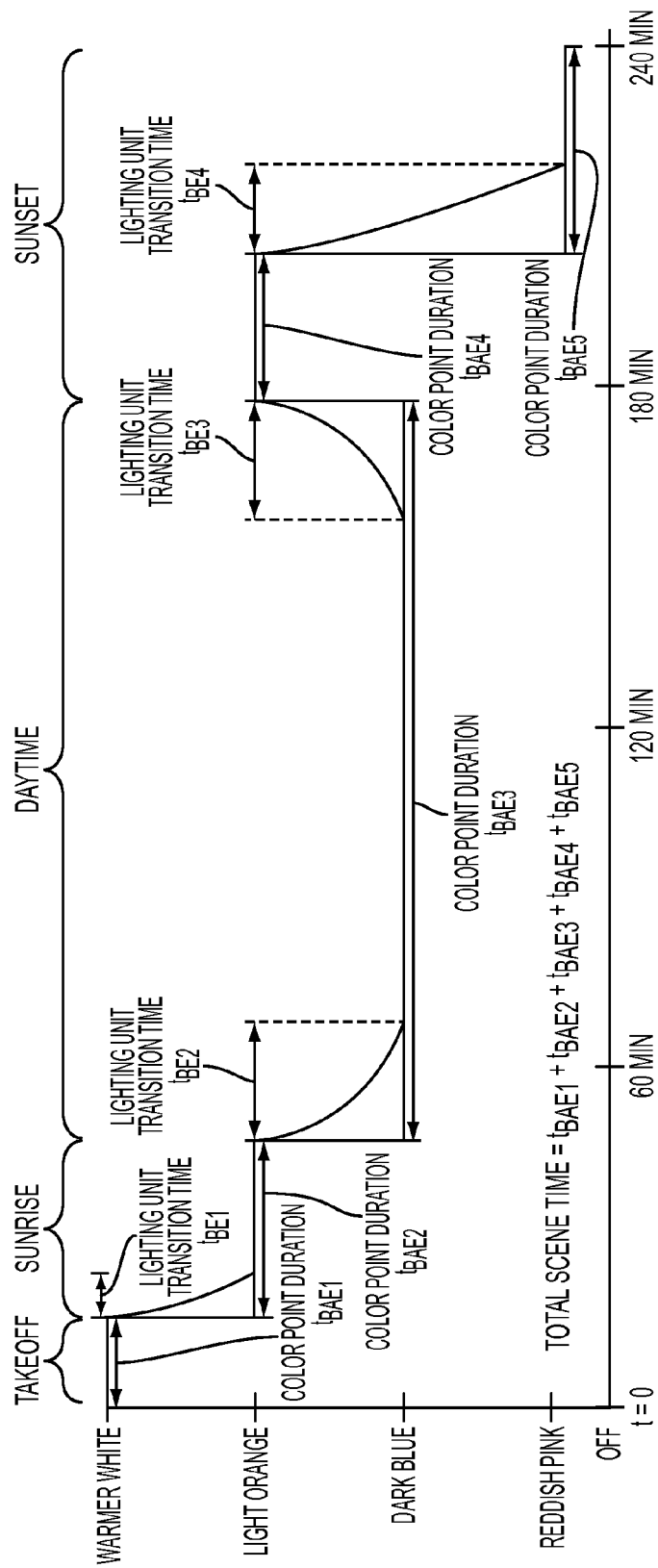
FIG. 5 is an exemplary lighting scene profile.

FIG. 5 shows an example of a dynamic lighting scene profile. As shown in FIG. 5, in the first lighting interval, beginning at time t=0, lighting is set to Warmer White. In this example, this interval, e.g., Color Point Duration $t_{BAE1}$, occurs during takeoff. The next time interval, Color Point Duration $t_{BAE2}$, occurs during sunrise. At the beginning of $t_{BAE2}$, the lighting changes from Warmer White to Light Orange during the Lighting Unit Transition Time $t_{BE1}$. The next time interval, Color Point Duration $t_{BAE3}$, occurs during daytime. The Lighting Unit Transition Time $t_{BE2}$ is the time in which the lighting changes from Light Orange to Dark Blue. As shown in FIG. 5, this occurs approximately 40 minutes after time t=0. Toward the end of daytime $t_{BAE3}$, during the Lighting Unit Transition Time $t_{BE3}$ lighting changes from Dark Blue to Light Orange. This occurs at the end of Color Point Duration $t_{BAE3}$. During sunset, about 180 minutes after time t=0, Color Point Duration $t_{BAE5}$, occurs and the lighting changes from Light Orange to Reddish Pink during Lighting Unit Transition Time $t_{BE4}$. Next, Color Point Duration $t_{BAE5}$ occurs and the lighting is constant at Reddish Pink.

The novel invention involves thinking of the existing lighting scenes as a palette from which an entire flight's cabin interior profile can be created instead of as a static condition selected by the flight attendant. The invention advantageously enables mood lighting to be directly associated with flight profile and to remain constant within each phase of flight. Beneficially, multiple changes in the state of attendant and passenger services can be achieved within each phase of flight.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium is a computer readable storage device, which may be, for example, a magnetic, optical, electronic, electromagnetic, infrared, or semiconductor system, apparatus, or device, or any suitable combination of the foregoing; however, the computer readable storage device is not limited to these examples. Additional particular examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage device.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for vehicle cabin control, comprising steps of:
    creating one or more collection of set-points, each set-point comprising a duration and settings for one or more cabin features, each cabin feature controlling an element in a location in the vehicle cabin;
    establishing an order and duration for the set-points;
    uploading the set-points to a cabin management system;
    executing the set-points in the established order; and
    when a request is received, modifying the duration in accordance with user preferences based on the request.

2. The method according to claim 1, wherein the elements controlled by the cabin features comprise one or more of lighting, cabin ready, cabin temperature, and cell phone power.

3. The method according to claim 1, wherein one of the collection of set-points is the initial features and another of the collection of set-points is the termination features.

4. A system for vehicle cabin control comprising:
    a cabin management system having a processor, and
    a module operable to create one or more collection of set-points, each set-point comprising a duration and settings for one or more cabin features, each cabin feature controlling an element in a location in the vehicle cabin; to establish an order and duration for the set-points; to upload the set-points to the cabin management system; to execute in the cabin management system the set-points in the established order; and when a request is received, to modify the duration in accordance with user preferences based on the request.

5. The system according to claim 4, wherein the elements controlled by the cabin features comprise one or more of lighting, cabin ready, cabin temperature, and cell phone power.

6. The system according to claim 4, wherein one of the collection of set-points is the initial features and another of the collection of set-points is the termination features.

7. A computer readable storage medium storing a program of instructions executable by a machine to perform a method for vehicle cabin control, comprising:
    creating one or more collection of set-points, each set-point comprising a duration and settings for one or more cabin features, each cabin feature controlling an element in a location in the vehicle cabin;
    establishing an order and duration for the set-points;
    uploading the set-points to a cabin management system;
    executing the set-points in the established order; and
    when a request is received, modifying the duration in accordance with user preferences based on the request.

8. The program according to claim 7, wherein the elements controlled by the cabin features comprise one or more of lighting, cabin ready, cabin temperature, and cell phone power.

9. The program according to claim 7, wherein one of the collection of set-points is the initial features and another of the collection of set-points is the termination features.

10. The method according to claim 1, wherein the location in the vehicle cabin comprises one of an attendant work area and a passenger in-flight area.

11. The system according to claim 4, wherein the location in the vehicle cabin comprises one of an attendant work area and a passenger in-flight area.

12. The program according to claim 7, wherein the location in the vehicle cabin comprises one of an attendant work area and a passenger in-flight area.

* * * * *